United States Patent

[11] 3,625,624

| [72] | Inventor | Robert Fitzsimmons<br>Warren, Mich. |
| --- | --- | --- |
| [21] | Appl. No. | 2,566 |
| [22] | Filed | Jan. 13, 1970 |
| [45] | Patented | Dec. 7, 1971 |
| [73] | Assignee | Galaxy Wedgebore Corporation<br>Detroit, Mich. |

[54] CUTTING ASSEMBLY
15 Claims, 7 Drawing Figs.

[52] U.S. Cl. .................................................... 408/116,
29/105, 408/197
[51] Int. Cl. ..................................................... B23b 29/034
[50] Field of Search .......................................... 408/146,
147, 153, 173, 178, 186, 197, 185, 116; 29/105

[56]            References Cited
                UNITED STATES PATENTS

| 1,463,089 | 7/1923 | Martyn......................... | 77/58 C |
| 3,274,862 | 9/1966 | Babich et al. .................. | 77/58 C |
| 3,521,507 | 7/1970 | Yogus et al. ................... | 77/58 C |

FOREIGN PATENTS

| 16,948 | 11/1916 | Great Britain................ | 77/58 C |
| 447,766 | 3/1968 | Switzerland................... | 77/58 K |

OTHER REFERENCES

Publication: American Machinist; Volume 46, No. 17 April 26, 1917

*Primary Examiner*—Gerald A. Dost
*Attorney*—Barnard, McGlynn & Reising

ABSTRACT: A boring bar having an end face extending transversely to the longitudinal axis of the boring bar with a slot extending completely through the boring bar and diametrically across the end face. First and second slide blocks are disposed in side-by-side overlapping relationship in the slot. The slide blocks have first ends which are disposed in the slot and extend radially in opposite directions outwardly of the boring bar to oppositely disposed second ends. A cutting element is attached to the second end at each of the slide blocks. At least one threaded fastener extends through an elongated slot in each slide block and threadedly engages the bottom of the slot in the boring bar for attaching each slide block to the boring bar and for adjusting the radial position of each slide block independently of the other. The slot in the boring bar is generally T-shaped to define guide grooves and the slide blocks are identical in configuration and include guide flanges disposed in the grooves of the slot. In one embodiment each of the slide blocks includes a gauging recess and a gauge block having gauge ends is attached to the boring bar for radially positioning the slide bars.

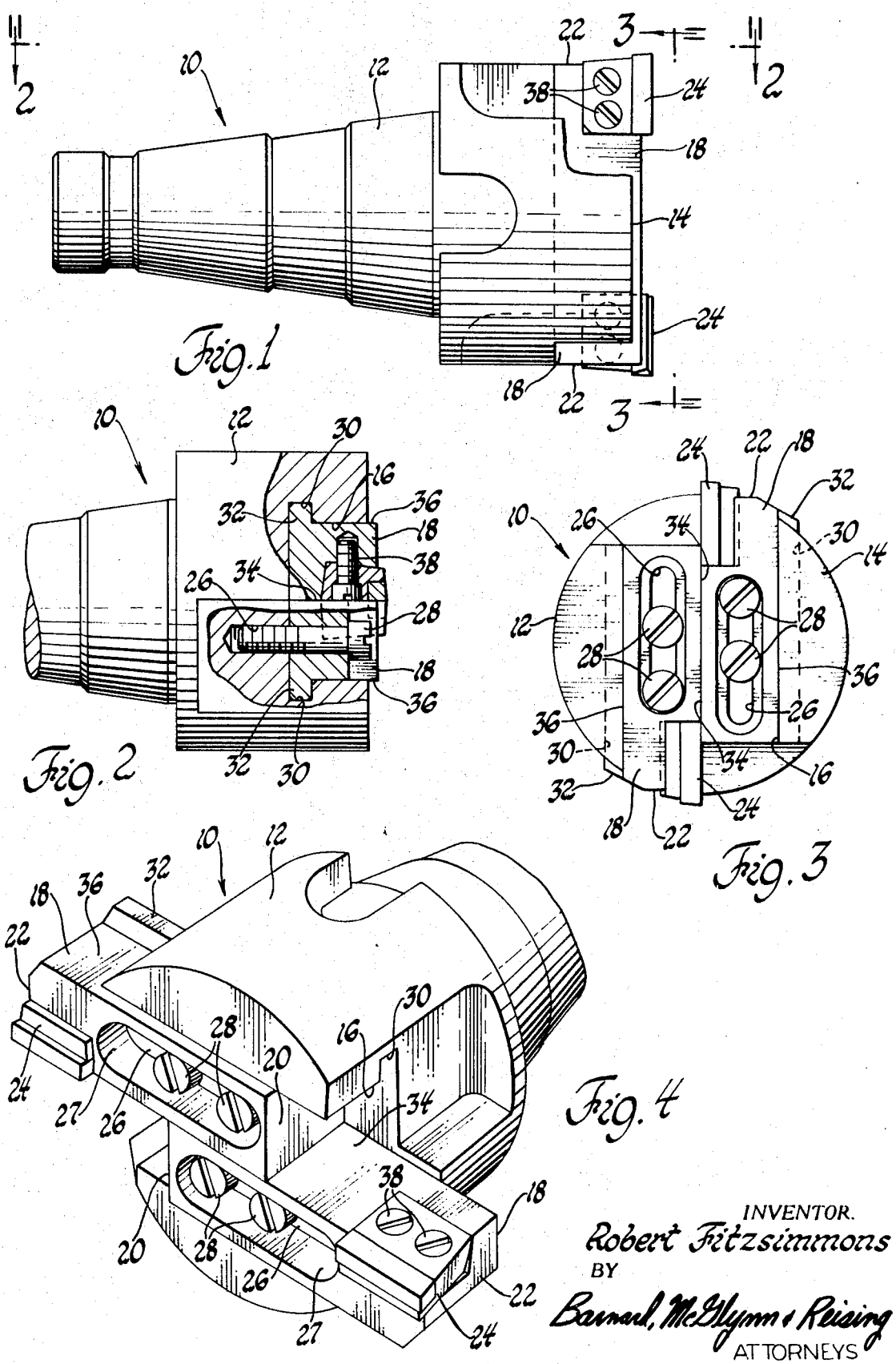

INVENTOR.
Robert Fitzsimmons
BY
Barnard, McGlynn & Reising
ATTORNEYS

CUTTING ASSEMBLY

This invention relates to a cutting assembly and more specifically to the construction of a boring bar and the components associated therewith for supporting cutting elements.

Various constructions of boring bars are known in the prior art.

It is, however, an object and feature of this invention to provide a cutting assembly including a boring bar supporting two slide blocks extending in opposite radial directions and supporting cutting elements at the outward ends thereof in a manner that the radial position of the slide blocks may be adjusted independently of one another.

It is another object and feature of this invention to wherein such an assembly wherein the slide blocks are identical in configuration to facilitate the grinding or sharpening of the cutting elements thereof.

In correlation with the foregoing objects and features, it is another object and feature of this invention to provide such an assembly wherein the slide blocks and the slot in the boring bar have coacting surfaces to prevent cocking of the slide blocks relative to the boring bar.

In correlation with the foregoing objects and features, it is another object and feature of this invention to provide such an assembly which includes a gauge block attached to the boring bar and engaging gauging surfaces on the slide blocks for radially positioning the slide blocks.

In correlation with the foregoing objects and features, it is another object and feature of this invention to provide such an assembly wherein the cutting elements are adjustably mounted on the slide blocks so as to maintain a predetermined distance between the cutting edges of the cutting elements and the gauging surfaces in the slide blocks.

Other objects and attendant advantages of the present invention will be readily appreciated as the same becomes better understood by reference to the following detailed description when considered in connection with the accompanying drawings wherein:

FIG. 1 is an elevational view partly broken away of a preferred embodiment of the instant invention;

FIG. 2 is a fragmentary view partially broken away and taken substantially along line 2—2 of FIG. 1;

FIG. 3 is a view taken substantially along line 3—3 of FIG. 1;

FIG. 4 is a perspective view of the preferred embodiment of FIGS. 1 through 3;

Figure 5:
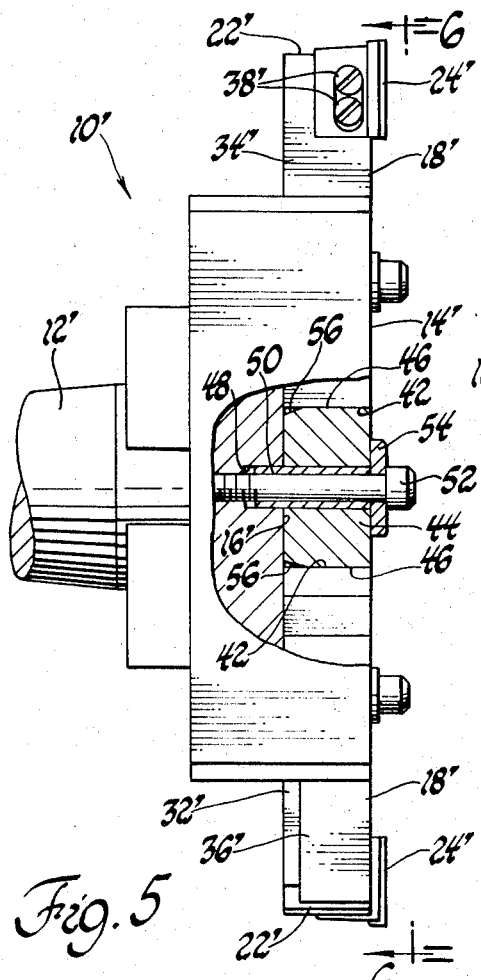
FIG. 5 is an elevational view partially broken away and in cross section of another preferred embodiment of the instant invention.

Referring now the the drawings wherein like numerals indicate like or corresponding parts throughout the several views, preferred embodiments of the instant invention are generally shown at 10 and 10' respectively.

The cutting assemblies 10 and 10' include the boring bars 12 and 12'. The head of the boring bar 12 is generally circular whereas the head of the boring bar 12' has four sides. The boring bars 12 and 12' have end faces 14 and 14' extending transversely to the longitudinal axes thereof, the longitudinal axes extending centrally through the spindles of the boring bars 12 and 12'.

Slots 16 and 16' extend completely through the boring bars 12 and 12' diametrically across the end faces 14 and 14'. First and second slide blocks 18 in the assembly 10 and 18' in the assembly 10' are disposed in side-by-side overlapping relationship in the slots 16 and 16' respectively. The slide blocks have first ends 20 and 20' disposed in the slots 16 and 16' and extend from those first ends radially outwardly of the boring bars 12 and 12' to oppositely disposed second ends 22 and 22'.

Cutting elements 24 and attached to the second ends 22 of the slide blocks 18 and cutting elements 24' are attached to the second end 22' of the slide block 18'.

First attachment mans attaches the first slide block of the pair 18 to the boring bar 12 and is operable to adjust the radial position of the first slide block 18 independently of the other slide block 18 and a second attachment means attaches the second slide block of the pair 18 to the boring bar 12 and is also operable to adjust the radial position of the second slide block 18 independently of the other slide block 18. There is also included first and second attachment means for attaching the slide bars 18' to the boring bar 12'. More specifically, the attachment means in the assembly 10 includes elongated slots 26 extending through the slide blocks 18 in a direction parallel to the longitudinal axis of the boring bar 12. The attachment means includes fasteners or bolts 28 extending through the elongated slots 26 and threadedly engaging the boring bar 12 in the bottom of the slot 16 therein. The slide blocks 18 are recessed at 27 and the heads of the bolts 28 are disposed in the recesses 27. In a like manner the slide blocks 18' include elongated slots 26' and fasteners or bolts 28' extend through the elongated slots 26' and threadedly engage the boring bar 12' in the bottom of the slot 16' therein.

The slide blocks 18 are identical to one another in configuration and the slide blocks 18' are identical to one another in configuration. The slots 16 and 16' extend into the boring bars 12 and 12' from the end faces 14 and 14' and are generally T-shaped in cross section so as to define oppositely disposed grooves 30 and 30' extending across the boring bars 12 and 12'. Each of the slide blocks 18 includes a guide flange 32 extending therefrom in a direction parallel to the end face 14 and in total mating engagement with one of the grooves 30. In a like manner, each of the slide blocks 18' includes a guide flange 32' extending therefrom in a direction parallel to the end face 14' and in total mating engagement with the grooves 30'.

The slide blocks include inwardly directed sides 34 and 34' having portions which overlap and engage one another. The slide blocks also include outwardly directed sides 36 and 36' which engage the parallel side walls of the slot 16 and 16' respectively.

The cutting elements 24 and 24' are removably attached to the slide blocks by fasteners 38 and 38' and are disposed in pockets in the slide blocks which have walls being nonperpendicular to one another so as to prevent the cutting elements from cocking relative to the slide blocks when heavy cutting forces are applied thereto.

Figure 6:
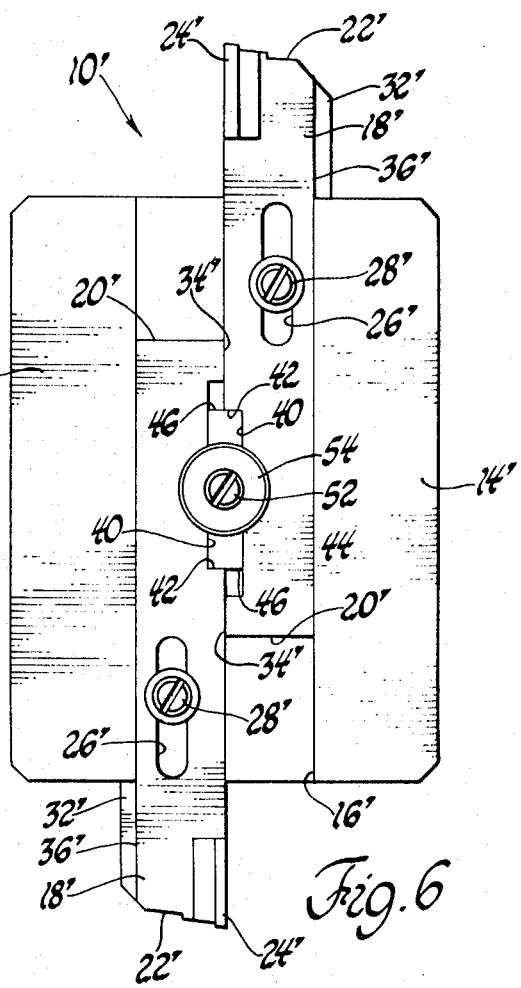
FIG. 6 is a view taken substantially along line 6—6 of FIG. 5.
Figure 7:
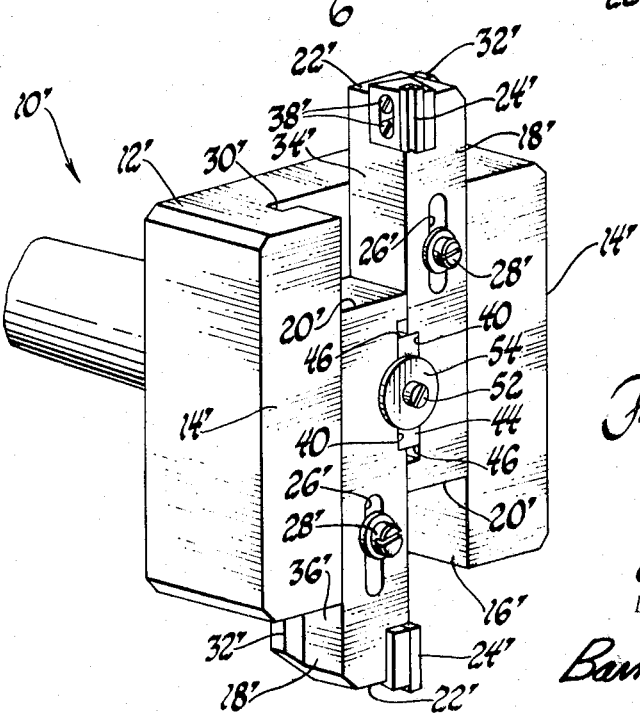
FIG. 7 is a perspective view of the preferred embodiment of FIGS. 5 and 6.

Turning now more specifically to the assembly 10' shown in FIGS. 5 through 7, each of the slide blocks 18' includes a gauging recess 40 in the inwardly directed side 34' thereof. Each gauging recess 40 defines a gauging surface 42 which faces toward the longitudinal axis of the boring bar 12'. A gauge block 44 having oppositely disposed parallel gauging ends 46 is attached to the boring bar 12' with the gauging ends 46 in engagement with the gauging surfaces 42 of the slide blocks 18' for radially positioning the slide blocks 18'.

There is included positioning means coacting between the boring bar 12' and the gauge block 44 for properly positioning the gauge block 44 relative to the boring bar 12'. More specifically, the positioning means includes a bore 48 extending into the bottom of the slot 16' and the boring bar 12' and an extension 50 extending from the gauge block 44 and disposed in the bore 48. The bore 48 is circular and the extension 50 is a sleeve secured to the gauge block 44 and machined to precisely fit within the bore 48 for properly positioning the gauge block 44. Instead of the sleeve 50 it will be understood that there may be an integral projection extending from the gauge block 44 and machined to fit within the machined bore 48. The positioning means also includes a threaded fastener or bolt 52 extending through the washer 54 and extension 50 and threadedly engaging the bore 48. The washer 54 may be a separate washer or may be integrally formed with either the sleevelike extension 50 or the bolt 52.

The gauge block 44 includes parallel side surfaces extending between the gauging ends 46 and parallel top and bottom walls with the bottom wall engaging the bottom of the slot 16' and the top wall facing outwardly toward the head of the fastener or bolt 52. The gauging ends 46 of the gauge block 44 are joined to the bottom wall of the gauge block 44 by short inwardly tapered portions 56 as shown in FIG. 5. These short inwardly tapered portions facilitate the insertion of the gauge block 44 between the slide blocks 18'.

One further difference in the assembly 10' over the assembly 10 is that the cutting elements 24' have elongated slots therein through which the fasteners 38' extend for adjusting the position of the cutting elements 24 relative to the slide bars 18' for maintaining a predetermined distance between the cutting elements 24' and the associated gauging surface 42. In other words, the radial position of the cutting elements 24' is adjustable to maintain a known distance between the cutting elements 24' and the gauging surface 42 on the slide block on which the cutting element 24' is supported.

It will be appreciated that in the embodiment of FIGS. 5 through 7, various gauge blocks 44 having various different distances between the gauging ends 46 thereof may be positioned on the boring head with highly machined gauging ends 46 thereof engaging the highly machined gauging surfaces 42 of the slide blocks 18' to properly radially position the slide blocks 18'. Once the desired radial position of the slide blocks 18' is attained, the bolts 28' are tightened to maintain the slide blocks 18' in the desired position.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A cutting assembly comprising; a boring bar having an end face extending transversely to the said boring bar and diametrically across said face, first and second slide blocks disposed in side-by-side overlapping relationship in said slot, said slide blocks have first ends disposed in said slot and extend therefrom radially outwardly of said boring bar to oppositely disposed second ends, a cutting element attached to said second end of each of said slide blocks, first attachment means attaching said first slide block to said boring bar and operable to adjust the radial position of said first slide block independently of said second slide block, second attachment means attaching said second slide block to said boring bar and operable to adjust the radial position of said second slide block independently of said first slide block, each of said slide blocks including an elongated slot extending therethrough in a direction parallel to said longitudinal axis, said first attachment means including at least one fastener extending through said elongated slot in said first slide block and threadedly engaging said boring bar in said slot therein, and said second attachment means including at least one fastener extending through said elongated slot in said second slide block and threadedly engaging said boring bar in said slot therein.

2. An assembly as set forth in claim 1 wherein said slide blocks are identical in configuration.

3. An assembly as set forth in claim 2 wherein said slot extends into said boring bar from said end face thereof and is generally T-shaped in cross section so as to define oppositely disposed grooves extending across said boring bar.

4. An assembly as set forth in claim 3 wherein each of said slide blocks includes a guide flange extending therefrom in a direction parallel to said end face and in mating engagement with one of said grooves.

5. An assembly as set forth in claim 4 wherein said slide blocks include inwardly directed sides having portions which overlap and engage one another, and outwardly directed sides which engage the walls of said slot.

6. An assembly as set forth in claim 5 wherein each of said slide blocks includes a gauging recess in the inwardly directed side thereof to define a gauging surface facing toward said longitudinal axis of said boring bar, a gauge block having oppositely disposed parallel gauging ends attached to said boring bar with said gauging ends in engagement with said gauging surfaces of said slide blocks for radially positioning said slide blocks.

7. An assembly as set forth in claim 6 including positioning means coacting between said boring bar and said gauge block for properly positioning said gauge block relative to said boring bar.

8. An assembly as set forth in claim 7 wherein said gauge block includes parallel side surfaces extending between said gauging ends and parallel top and bottom walls with said bottom wall engaging the bottom of said slot in said boring bar.

9. An assembly as set forth in claim 8 wherein said gauging ends are joined to said bottom wall by short inwardly tapered portions which facilitate the insertion of said gauge block between said slide blocks.

10. An assembly as set forth in claim 9 wherein said positioning means includes a bore extending into the bottom of said slot in said boring bar and an extension from said gauge block disposed in said bore, said gauge block being attached to said boring bar by a fastener extending through said extension and said bore and threadedly engaging said boring bar.

11. An assembly as set forth in claim 10 wherein said cutting elements are removably disposed in pockets in said slide blocks, at least some of the walls of each pocket being nonperpendicular to one another.

12. A cutting assembly comprising; a boring bar having an end face extending transversely to the longitudinal axis thereof, a slot extending completely through said boring bar and diametrically across said face, first and second slide blocks disposed in side-by-side overlapping relationship in said slot, said slide blocks have first ends disposed in said slot and extend therefrom radially outwardly of said boring bar to oppositely disposed second ends, a cutting element attached to said second end of each of said slide blocks, first attachment means attaching said first slide block to said boring bar and operable to adjust the radial position of said first slide block independently of said second slide block, second attachment means attaching said second slide block to said boring bar and operable to adjust the radial position of said second slide block independently of said first slide block, each of said slide blocks including a gauging recess therein to define a gauging surface facing toward said longitudinal axis of said boring bar, and a gauge block having oppositely disposed gauging ends attached to said boring bar with said gauging ends in engagement with said gauging surfaces for radially positioning said slide blocks.

13. An assembly as set forth in claim 12 including positioning means coacting between said boring bar and said gauge block for properly positioning said gauge block relative to said boring bar.

14. An assembly as set forth in claim 13 wherein said gauge block includes parallel side surfaces extending between said gauging ends and parallel top and bottom walls with said bottom wall engaging the bottom of said slot in said boring bar, said gauging ends being joined to said bottom wall by short inwardly tapered portions which facilitate the insertion of said gauge blocks between said slide blocks.

15. An assembly as set forth in claim 12 including means for adjusting the position of said cutting elements relative to said slide bars for maintaining a predetermined distance between said cutting elements and the associated gauging surface.

* * * * *

UNITED STATES PATENT OFFICE
CERTIFICATE OF CORRECTION

Patent No. __3,625,624__  Dated __December 7, 1971__

Inventor(s) __Robert Fitzsimmons__

It is certified that error appears in the above-identified patent and that said Letters Patent are hereby corrected as shown below:

Column 1, line 14 "wherein" should be --provide--; column 1, line 54 "the" (first occurrence) should be --to--; column 1, line 66 after "12'" insert --and--; column 1, line 73 "and" should be --are--; column 1, line 75 "block" should be --blocks--. Column 2, line 1 "mans" should be --means--. Column 3, line 37 after "the" insert --longitudinal axis thereof, a slot extending completely through--.

Signed and sealed this 4th day of July 1972.

(SEAL)
Attest:

EDWARD M. FLETCHER, JR.
Attesting Officer

ROBERT GOTTSCHALK
Commissioner of Patents